United States Patent [19]

Okamura et al.

[11] Patent Number: 5,218,580
[45] Date of Patent: Jun. 8, 1993

[54] USER MANAGEMENT SYSTEM FOR MUSICAL ACCOMPANIMENT PLAYING APPARATUS

[75] Inventors: Masahiro Okamura; Masuhiro Sato; Naoto Inaba; Yoshiyuki Akiba; Toshiki Nakai, all of Tokyo, Japan

[73] Assignee: Pioneer Electronic Corporation, Tokyo, Japan

[21] Appl. No.: 865,928

[22] Filed: Apr. 9, 1992

[30] Foreign Application Priority Data

Apr. 17, 1991 [JP] Japan .................................. 3-85179

[51] Int. Cl.⁵ .............................................. H04B 1/20
[52] U.S. Cl. ................................................ 369/2; 369/4
[58] Field of Search ..................... 369/2, 1, 3, 4, 32; 360/27, 55, 61; 381/26, 61; 84/609, 601

[56] References Cited

U.S. PATENT DOCUMENTS 5,033,036  7/1991  Ohmori et al. ......................... 369/3

FOREIGN PATENT DOCUMENTS

0134966  6/1986  Japan .

*Primary Examiner*—Robert J. Pascal
*Assistant Examiner*—Ali Neyzari
*Attorney, Agent, or Firm*—Kane, Dalsimer, Sullivan, Kurucz, Levy, Eisele and Richard

[57] ABSTRACT

A user management system is provided for a musical accompaniment playing (KARAOKE) apparatus. The system comprises an individual information recording medium, an input unit, a music information reproducing unit, a control unit and a calculation unit. The input unit is used to input user identification information and music piece selection. The control unit serves to set a musical environment and to record changes in the environment for the user. The calculation unit makes adjustments based on the number of music pieces recorded on the individual information recording medium.

9 Claims, 6 Drawing Sheets

FIG.6

USER MANAGEMENT SYSTEM FOR MUSICAL ACCOMPANIMENT PLAYING APPARATUS

BACKGROUND OF THE INVENTION

This invention relates to a user management system for a musical accompaniment playing apparatus called "KARAOKE" equipment.

As a method for charging or management of a user in a musical accompaniment playing system, there are known methods using a coin box, a prepayed card, and an IC card, etc.. A coin and a prepayed card are used only for collection of money, and an IC card is used for reservation of music pieces, collection of money, and management of balance.

The method of using a coin box is most popular. However, it has problems that as coins must be collected when the box is filled with coins, it takes much time and labor in collection of coins, and that a dealer must manage money. In the case of a prepayed card, it is only available for money collection and a prepayed card issuance machine is required. Further, there is a possibility of a data alteration. In the case of the IC card, not only charge management can be carried out, but also data relating to users can be stored. However, at the present, there were the problems that the card itself is expensive and that there is high possibility of data alteration.

In addition to the above mentioned methods, method of using a floppy disk or a RAM card are conceivable. The former method is inexpensive, however, the data can be easily deteriorated by an external magnetic interference. On the other hand, the latter method has a problem that the RAM card is expensive similarly to the IC card.

SUMMARY OF THE INVENTION

An object of this invention is to provide a system capable of easily and safely carrying out a charge management and a user data management for a musical accompaniment playing apparatus called "KARAOKE".

According to one aspect of this invention, there is provided a user management system for a musical accompaniment playing apparatus, which comprises music information reproducing means for mixing voice information of a singer with information of musical accompaniment and outputting mixed music information, an individual information recording medium for storing at least user identification information, select means for selecting desired music pieces, information reading/recording means for reading information from the individual information recording medium and for recording information into the individual information recording medium, control means for recording a number of music pieces selected by said select means into the individual information recording medium and for allowing the music information reproducing means to reproduce the mixed information of the selected music piece, information reading means for reading out the number of the selected music pieces from the individual information recording medium, and calculation means for calculating total fee on the basis of information read by said information reading means.

In accordance with one form of this invention, when an individual information recording medium is inserted and a music piece selection of musical accompaniment is input through the input unit, user identification information is read out from the individual information recording medium, and music number information of the selected music pieces is recorded onto the individual information recording medium. The selected music piece is reproduced by the music information reproducing unit under control of the control unit. When a user carries the individual information recording medium to a charge adjustment counter for a payment, music number information is read out therefrom and summed by the calculation unit. Thus, a total charge is calculated and is stored. Accordingly, in this system, since only the user identification information and the information of selected music piece number are stored on the individual information recording medium, an information recording medium having small storage capacity can be used.

According to another aspect of this invention, there is provided a user management system for a musical accompaniment playing apparatus, which comprises music information reproducing means for mixing voice information of a singer with information for musical accompaniment and outputting mixed music information, an individual information recording medium for storing at least user identification information, information memory unit for storing at least musical environment information set by a user, and control means for allowing the music information reproducing means to reproduce the mixed music information in accordance with the musical environment information, wherein the control means renews the musical environment information when new environment information is set by the user.

In accordance with another form of this invention, when a user uses the music information reproducing unit, user identification information is read out from the individual information recording medium. Thus, musical environment information such as quality and quantity of the sound effects, e.g., key, tempo of a music, sound volume of a microphone, or an echo is stored into the information memory of the information reproducing unit. The musical environment information thus stored is read out and is automatically set when the user uses the system next time. Namely, as the musical environment information is entirely stored in the system side, the user does not need to set the musical environment information every time when he uses the system. Accordingly, since it is sufficient that only user identification information is stored on the individual information recording medium, a simple magnetic card or the like may be used as the individual information recording medium.

As stated above, according to this present invention, charge management and user data management for a musical accompaniment playing system can be easily and safely carried out.

DESCRIPTION OF THE PREFERRED EMBODIMENTS

Preferred embodiments of this invention will now be described with reference to the attached drawings.

FIRST EMBODIMENT

A first embodiment of this invention is shown in FIGS. 1 to 4. This user management system for a musical accompaniment playing apparatus comprises a musical accompaniment information control system 10 as a first system and an adjustment system 20 as a second system.

Figure 1:
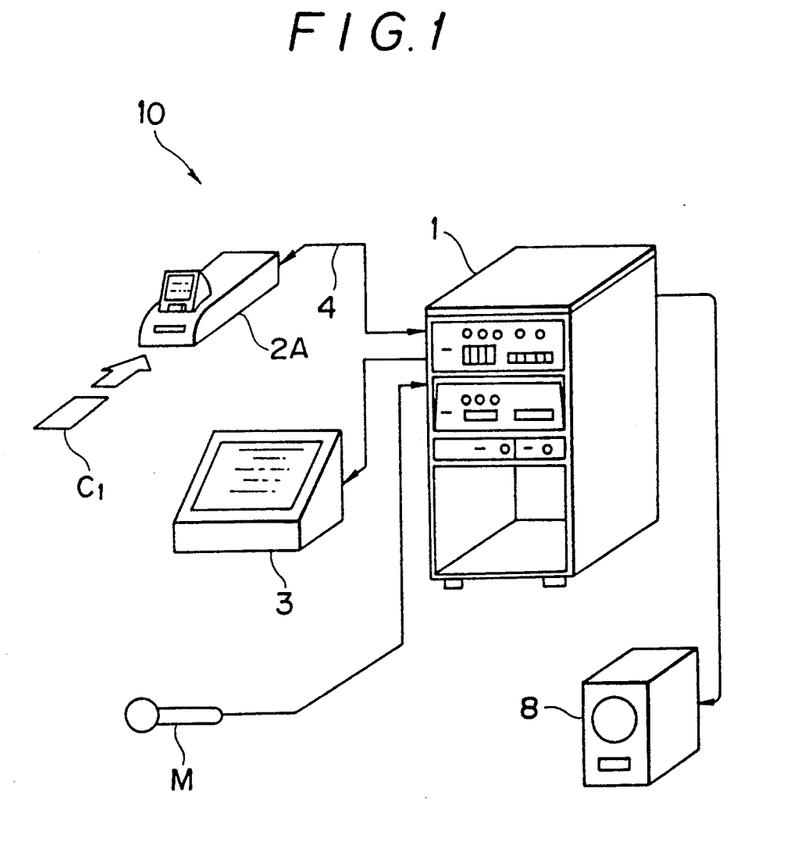
FIG. 1 is a view showing the outline of a user management system according to a first embodiment of this invention.
Figure 2:
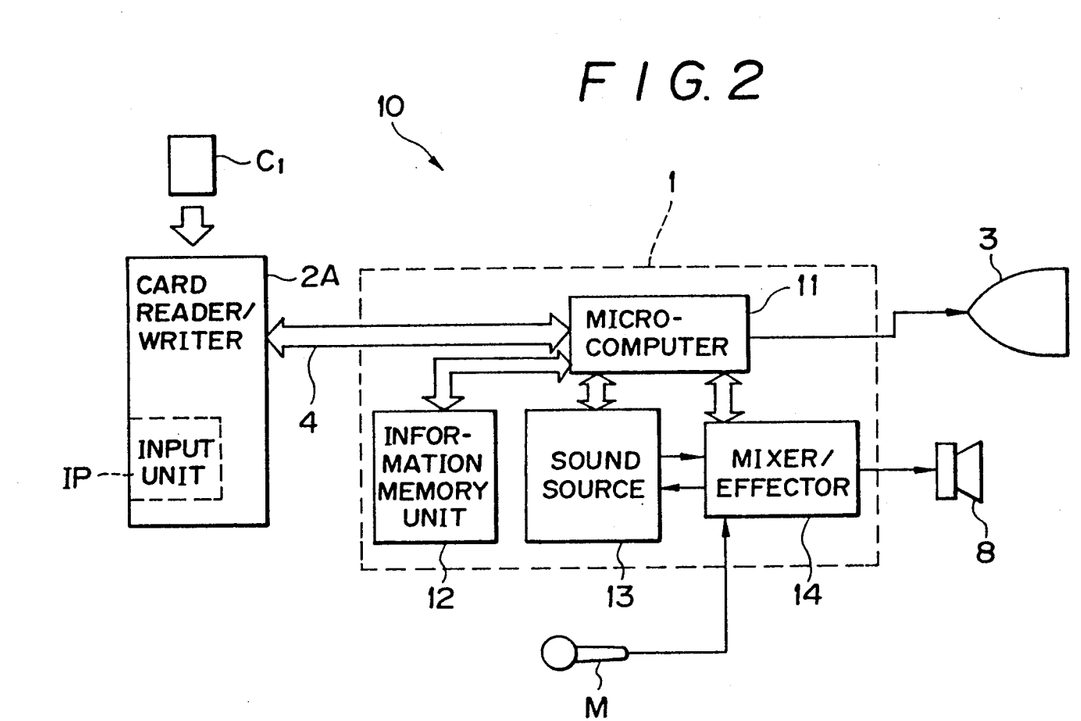
FIG. 2 is a block diagram showing the configuration of the user management system shown in FIG. 1.

As shown in FIG. 1, the musical accompaniment information control system 10 comprises a musical accompaniment playing apparatus 1, a card reader/writer 2A, a display 3, and a magnetic card C1. The musical accompaniment playing apparatus 1 and the card reader/writer 2A are connected to each other by way of a data bus 4. A microphone M and a speaker 8 are connected to the musical accompaniment playing apparatus 1. The configuration of the musical accompaniment control system 10 is shown in a block form in FIG. 2. As shown in FIG. 2, the musical accompaniment playing apparatus 1 comprises a microcomputer 11, an information memory unit 12, a sound source 13, and a mixer/effector 14. A plurality of card readers/writers 2A each having an input unit IP are installed at respective seats within a shop.

The magnetic card C1 corresponds to an individual information recording medium. The microphone M, the sound source 13, the mixer/effector 14, and the speaker 8 constitute a music information reproducing means. The input unit IP corresponds to input means. In addition, the microcomputer 11 corresponds to a control means.

Figure 3:
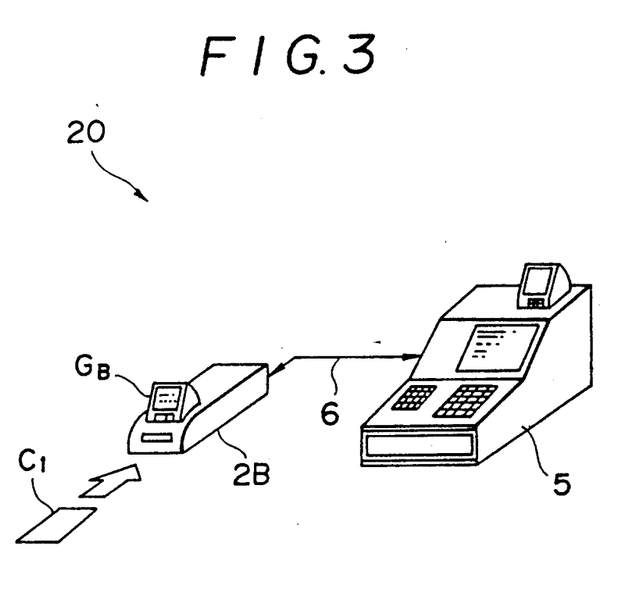
FIG. 3 is a view showing the outline of an adjustment system of the user control system according to the first embodiment of this invention.

As shown in FIG. 3, the adjustment system 20 comprises a card reader/writer 2B, a register 5, and the magnetic card C1. The card reader/writer 2B and the register 5 are connected to each other by way of a data bus 6. The configuration of the adjustment system 20 is shown in a block form in FIG. 4. The card reader/writer 2B corresponds to the information reading means and the register 5 corresponds to a calculation means.

The operation of this system will now be described. When the name of a user is registered at a shop, the user receives a magnetic card C1 of his own from the shop. It is to be noted that the musical accompaniment playing apparatus become operative only when the magnetic card is loaded. When the user sings a song with a musical accompaniment, the user inserts the magnetic card C1 into the card readers/writers 2A provided in the vicinity of respective seats and makes selections of desired music pieces by the input unit IP. At this time, an ID number is read out by the card reader/writer 2A as a user identification information. Then, information of the selected music pieces is stored in a user memory file within the information memory unit 12 corresponding to that user, and the number of music pieces selected is recorded on the magnetic card C1 by the card reader/writer 2A.

The microcomputer 11 reads out information of the music piece, corresponding to that user's ID number, stored in the information memory unit 12 and automatically retrieve and set the musical environment (key, tempo, microphone volume, or quantity of echo, etc.) of that user's last singing. The key is a musical interval (step) and used for adjusting the musical interval of a sound source to that of the user's singing voice. The key is changed by operating the mixer effector 14. The tempo is used for changing the speed of reproduction, which is changed by controlling the reading speed of information from the sound source 13. Further, the microphone volume and the quantity of echo is varied by controlling volume and echo volume of the mixer/effector 14, respectively.

Further, the microcomputer 11 controls the display 3 to indicate the songs which the user sang in past in order of frequency in singing of music pieces. The selection of music pieces is also output from the microcomputer 11 and displayed on the display 3. At the time when the user sings the selected song, the sound source 13 coded in accordance with the MIDI system, etc. outputs a musical accompaniment to the mixer/effector 14, in response to a command from the microcomputer 11. The user sings the song with the microphone M in harmony with the output musical accompaniment. A singing voice signal from the microphone is input to the mixer/effector 14 which mixes the voice signal with the musical accompaniment from the sound source 13. The mixed sound is output from the speaker 8. The musical environment can be changed during singing of the song and the changed data is stored as a new musical environment information.

Figure 4:
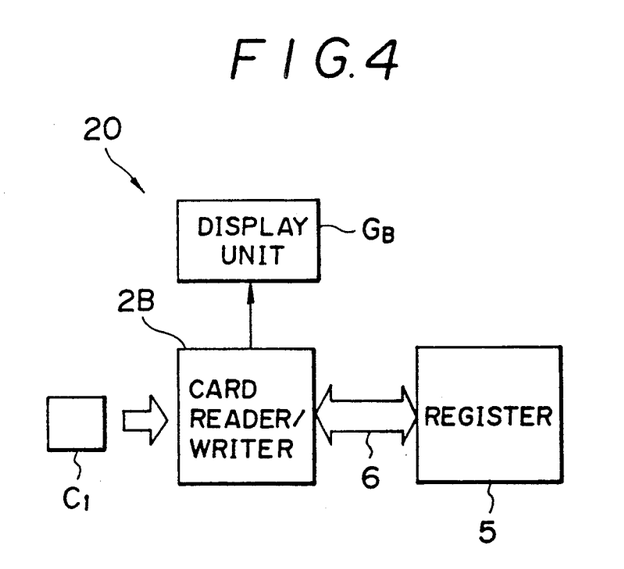
FIG. 4 is a block diagram showing the configuration of the adjustment system of the user management system shown in FIG. 3.

At the time of payment, the user inserts the magnetic card C1 into the card reader/writer 2B installed at the charge adjustment counter. The card reader/writer 2B reads out the number of selected music pieces recorded in the magnetic card C1 and output it to the register 5. The register 5 calculates a total fee on the basis of the number of music pieces and record it. In a manner as stated above, the charge adjustment can be carried out. In this case, the total fee may be displayed by display section GB of the card reader/writer 2B so that a user can easily recognize and confirm the amount. Further, statistics of user data such as the number of music pieces may be taken.

In this first embodiment, since information recorded on the magnetic card C1 is only ID information of users and the number of music pieces, and other information is stored in the system side. Accordingly, the memory capacity of the magnetic card C1 can be extremely small. It is to be noted that, in the first embodiment, since data indicative of the number of music pieces is recorded on the magnetic card C1, there was still left the possibility of alteration of data due to any magnetic disturbance, etc. A second embodiment described below would solve this problem.

SECOND EMBODIMENT

Figure 5:
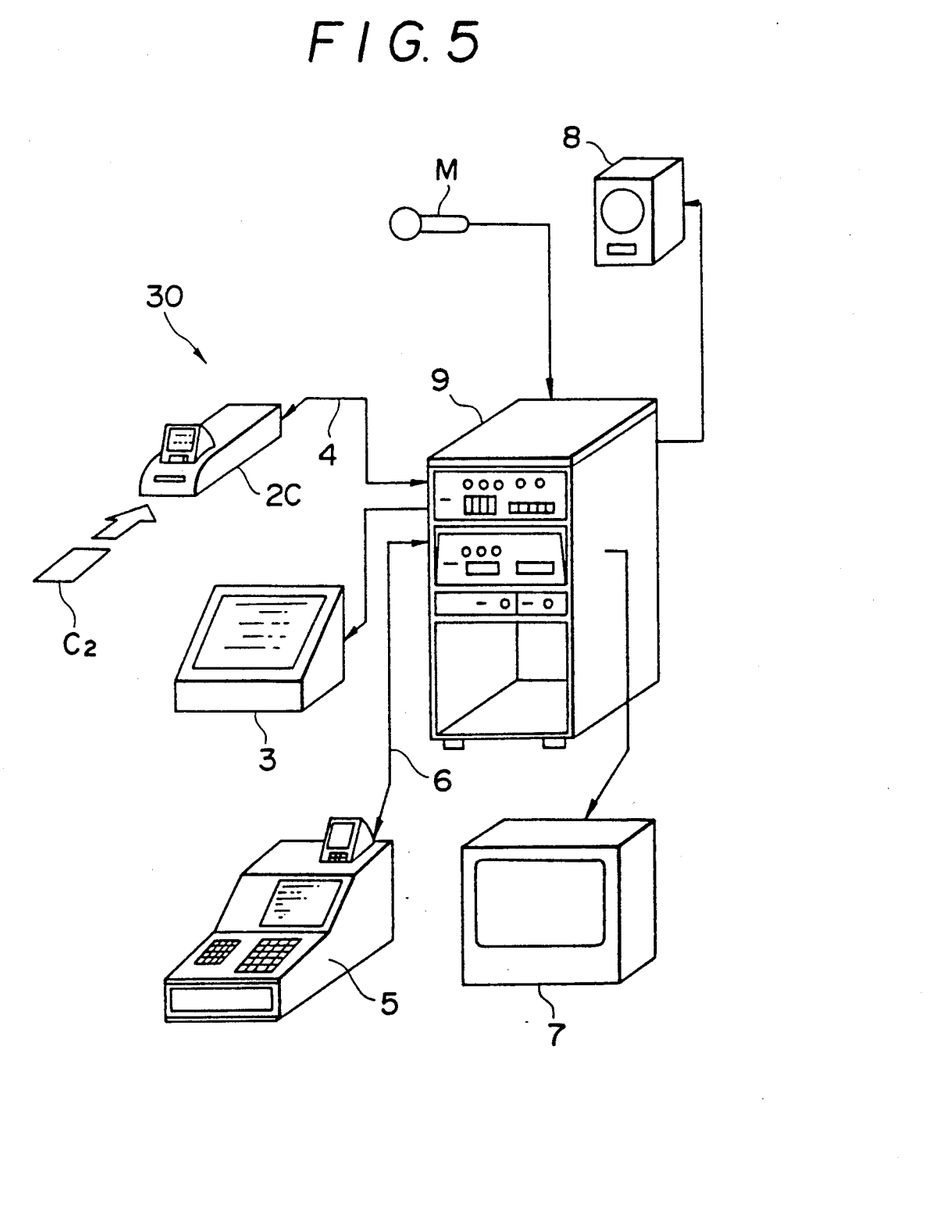
FIG. 5 is a view showing the outline of the user management system according to a second embodiment of this invention.
Figure 6:
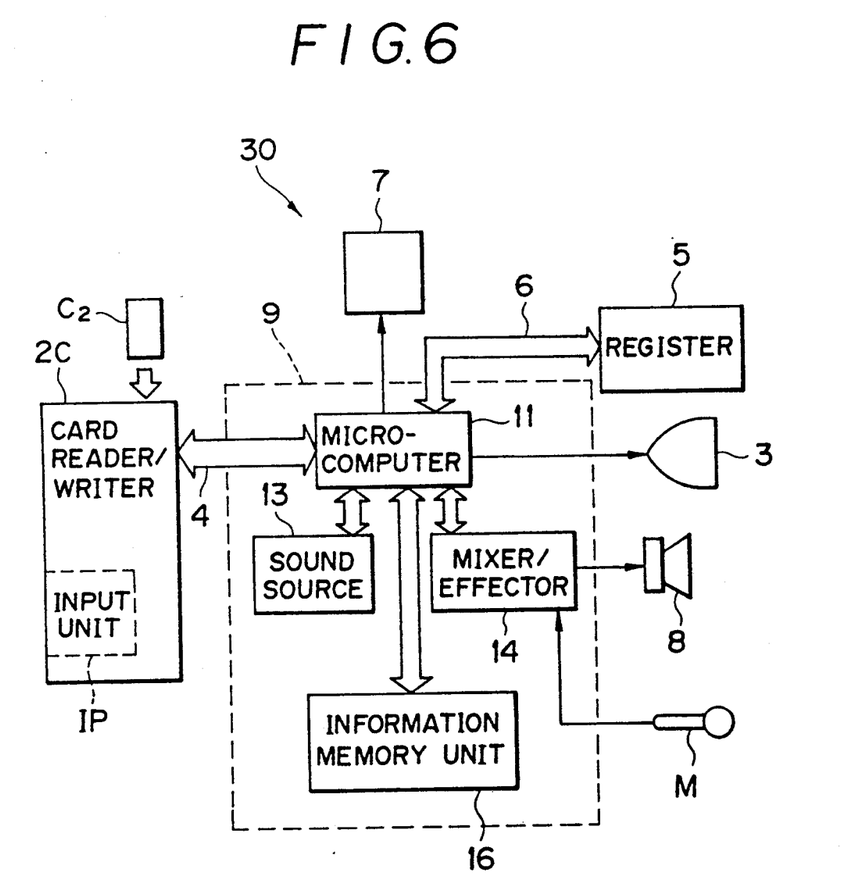
FIG. 6 is a block diagram showing the configuration of the user management system shown in FIG. 5.

The second embodiment will be described with reference to FIGS. 5 and 6.

This user management system 30 according to the second embodiment comprises a musical accompaniment playing apparatus 9, a card reader/writer 2C, a display 3, a register 5, a display 7, and a magnetic card C2. The card reader/writer 2C and the musical accompaniment playing apparatus 9 are connected to each other by way of a data bus 4, and the register 5 and the musical accompaniment playing apparatus 9 are connected to each other by way of a data bus 6. Further, a microphone M and a speaker 8 are connected to the musical accompaniment playing apparatus 9. The configuration of the user management system 30 is shown in a block form in FIG. 6. As shown in FIG. 6, the musical accompaniment playing apparatus 9 comprises a microcomputer 11, an information memory unit 16, a sound source 13, and a mixer/effector 14. Each card reader/writer 2C has an input unit IP. There are installed a plurality of card readers/writers at respective user seats. On the display 7, words of the song which user sing and a background picture (moving picture) are displayed. The background picture is read out from a medium such as an LD or a CD-I and reproduced on the display 7. The words of the song are output from the sound source 13 and superimposed on the background picture. The words and the background picture may be stored together in a recording medium and reproduced therefrom.

The magnetic card C2 corresponds to an individual information recording medium. The microphone M, the sound source 13, the mixer/effector 14, and the speaker 8 constitute a music information reproducing means. Further, the microcomputer 11 corresponds to control means, and the input unit IP corresponds to input means. In addition, the display 3 and the register 5 correspond to output means.

The operation of this system will now be described. The second embodiment differs from the first embodiment in that only information of user ID number is stored in a magnetic card C2. All other data such as the number of selected music pieces, the names of users or the musical environment relating to users are stored in the information memory unit 16 within the musical accompaniment playing apparatus 9. Accordingly, the card reader/writer 2C records only the ID number of a user onto the magnetic card C2, and if the ID number is already recorded on the magnetic card C2, it is sufficient that the card reader/writer 2C only reads out information from the card.

When the magnetic card is inserted into the card reader/writer 2C for the charge adjustment, the ID number of the user is read out by the card reader/writer 2C. The microcomputer receives the ID number of the user through the data bus 4 and sums the number of the music pieces stored in the information memory unit 16. Then the total number of the music pieces is transferred to the register 5 to carry out the charge adjustment. The number of reserved music pieces stored in the information memory unit 16 is reset to zero after the charge adjustment.

In this case, since data relating to the user, especially the number of the selected music pieces, is stored in the musical accompaniment playing apparatus 9, the data is prevented from an intentional and unfair data alteration. Further, when the magnetic card is subjected to an external magnetic disturbance, only information of ID number may be altered. Since other data are stored in the musical accompaniment playing apparatus, there does not occur serious problems. As stated above, the second embodiment provides further advantages of reducing the memory capacity of the magnetic card and preventing the data alteration.

Furthermore, it is possible to construct, on the basis of information of users in the musical accompaniment playing apparatus, a data base relating to personal data such as history of how many times the user comes to the shop or history of songs that the user sang. In addition, the above mentioned magnetic card may be a prepayed card.

It is to be noted that this invention is not limited to the above described embodiments. For example, not only a magnetic card but also a floppy disk or the like. may be used as a recording medium.

The invention may be embodied in other specific forms without departing from the spirit or essential characteristics thereof. The present embodiments are therefore to be considered in all aspects as illustrative and not restrictive, the scope of the invention being indicated by the appended claims rather than by the foregoing description and all changes which come within the meanings and range of equivalency of the claims are therefore intended to be embraced therein.

What is claimed is:

1. A user management system for a musical accompaniment playing apparatus, which comprises:
    a first system comprising;
        music information reproducing means for mixing voice information of a singer with information of musical accompaniment and outputting mixed music information;
        an individual information recording medium for storing at least user identification information;
        select means for selecting desired music pieces;
        information reading/recording means for reading information from the individual information recording medium and for recording information into the individual information recording medium; and
        control means for recording a number of music pieces selected by said select means into the individual information recording medium and for allowing the music information reproducing means to reproduce the mixed information of the selected music piece; and
    a second system comprising;
        information reading means for reading out the number of the selected music pieces from the individual information recording medium; and
        calculation means for calculating total fee on the basis of information read by said information reading means.

2. A user management system for a musical accompaniment playing apparatus according to claim 1, wherein said individual information recording medium is a recordable and erasable information recording medium.

3. A user management system for a musical accompaniment playing apparatus according to claim 1, wherein said individual information recording medium is a magnetic card.

4. A user management system for a musical accompaniment playing apparatus according to claim 1, wherein the first system further comprises a display unit for displaying names of the selected music pieces.

5. A user management system for a musical accompaniment playing apparatus according to claim 1, wherein said information reading/recording means comprising a memory means for storing information relating to the user, said information including names and a number of music pieces and musical environment set by the user.

6. A user management system for a musical accompaniment playing apparatus, which comprises:

music information reproducing means for mixing voice information of a singer with information for musical accompaniment and outputting mixed music information;

an individual information recording medium for storing at least user identification information;

information memory unit for storing at least musical environment information set by a user; and control means for allowing the music information reproducing means to reproduce the mixed music information in accordance with the musical environment information;

the control means renews the musical environment information when new environment information is set by the user.

7. A user management system for a musical accompaniment playing apparatus according to claim 6, wherein said individual information recording medium is a recordable and erasable information recording medium.

8. A user management system for a musical accompaniment playing apparatus according to claim 6, wherein said individual information recording medium is a magnetic card.

9. A user management system for a musical accompaniment playing apparatus according to claim 6, wherein said musical environment information includes at least one of key, tempo, microphone volume and quantity of echo.

* * * * *